(12) United States Patent
Ratasuk et al.

(10) Patent No.: US 7,321,570 B2
(45) Date of Patent: Jan. 22, 2008

(54) METHOD AND APPARATUS FOR DYNAMIC POWER ALLOCATION TO A MULTIMEDIA BROADCAST/MULTICAST SERVICE

(75) Inventors: Rapeepat Ratasuk, Schaumburg, IL (US); Jean-Aicard Fabien, Lincolnshire, IL (US); Amitava Ghosh, Buffalo Grove, IL (US); Weimin Xiao, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/770,906

(22) Filed: Feb. 3, 2004

(65) Prior Publication Data

US 2005/0169202 A1   Aug. 4, 2005

(51) Int. Cl.
*H04B 7/00* (2006.01)
*H04Q 7/00* (2006.01)
*H04H 1/00* (2006.01)

(52) U.S. Cl. .................. 370/318; 370/332; 370/487
(58) Field of Classification Search .............. 370/328, 370/338, 487, 252, 332, 318; 455/522
See application file for complete search history.

(56) References Cited

U.S. PATENT DOCUMENTS 7,085,581 B2 *  8/2006  Vanghi ................... 455/522
2003/0199452 A1 *  6/2003  Kim et al. ................ 455/69
2003/0134655 A1 *  7/2003  Chen et al. .............. 455/522
2003/0207696 A1 * 11/2003  Willenegger et al. ..... 455/522
2004/0085926 A1 *  5/2004  Hwang et al. ............ 370/328
2004/0131026 A1 *  7/2004  Kim et al. ................ 370/328
2004/0151133 A1 *  8/2004  Yi et al. .................. 370/312
2004/0266447 A1 * 12/2004  Terry ...................... 455/450
2005/0043033 A1 *  2/2005  Fabien et al. .......... 455/452.1
2005/0129058 A1 *  6/2005  Casaccia et al. .......... 370/464
2005/0213541 A1 *  9/2005  Jung et al. ............... 370/331

* cited by examiner

*Primary Examiner*—Doris H. To
*Assistant Examiner*—Feben Micael Haile

(57) ABSTRACT

A communication system is provided that dynamically allocates power to a Multimedia Broadcast/Multicast Service (an MBMS service). In response to determining to establish a Point-to-Multipoint (PTM) communication channel to multiple user equipment (UEs), the communication service assigns the PTM communication channel to the MBMS service, determines a power requirement associated with each user equipment (UE) of the multiple UEs based on a handover quality measurement associated with the UE to produce multiple power requirements, and allocates a power level to the PTM communication channel based on the multiple power requirements. The communication system further dynamically adjusts the allocated power based on a handover quality measurement associated with a UE of the multiple UEs that is received during provision of the MBMS service.

12 Claims, 4 Drawing Sheets

METHOD AND APPARATUS FOR DYNAMIC POWER ALLOCATION TO A MULTIMEDIA BROADCAST/MULTICAST SERVICE

FIELD OF THE INVENTION

The present invention relates generally to packet data communication systems, and, in particular, to a multimedia broadcast/multicast service in a packet data communication system.

BACKGROUND OF THE INVENTION

The Universal Mobile Telecommunication Service (UMTS) standard provides a compatibility standard for cellular mobile telecommunications systems. The UMTS standard ensures that user equipment (UEs) operating in a UMTS system can obtain communication services when operating in a system manufactured according to the standard. To ensure compatibility, radio system parameters and data transfer procedures are specified by the standard, including protocols governing digital control messages and bearer traffic that are exchanged over an air interface.

The UMTS standards provide, in 3GPP TS 25.344 (Third Generation Partnership Project Technical Specification 25.344) v0.5.0, 3GPP TS 23.246 v1.1.0, 3GPP TS 23.846 v6.1.0, 3GPP TS 25.331 v5.6.0, and 3GPP TS 25.346 v0.5.0, for a provision of a Multimedia Broadcast/Multicast Service (an MBMS service) by a UMTS communication system to UEs serviced by the system and subscribed to the service. The MBMS service provides for a multicast and unicast of MBMS data, typically in a format of Internet Protocol (IP) data packets, to the subscribed UEs. In order to ensure that the air interface resources of the UMTS communication system are not wasted, the system first estimates the number of recipients, that is subscribed UEs, in a cell providing MBMS data. Based on the estimated number of recipients, a Radio Network Controller (RNC) included in a UMTS infrastructure determines whether to establish a Point-To-Multipoint (PTM) communication channel in the cell or a Point-To-Point (PTP) communication channel to each recipient.

When the RNC determines to establish a PTM communication channel, typically the RNC then multicasts the MBMS data via a Forward Access Channel (FACH) that is mapped to a Secondary Common Control Physical Channel (S-CCPCH). Currently, common physical channels such as the S-CCPCH are not power controlled. Furthermore, the RNC and the Node B are not aware of a specific geographic location of each subscribing UE serviced by the Node B. As a result, when the RNC establishes an S-CCPCH for a multicast of MBMS data, the RNC instructs the Node B to allocate a fixed percentage of the Node B's transmit power to the S-CCPCH, which percentage is sufficient to provide an acceptable error rate at the edge of the cell serviced by the Node B.

For example, for a 64 kilobits per second (kbps) service, achieving a target Block Error Rate (BLER) of one percent (1%) at the edge of a cell may require approximately 25% of a Node B's power. As a result, an MBMS service may consume an inordinate percentage of a Node B's total transmit power and may limit the Node B's ability to provide other communication services to other UEs serviced by the Node. B. Furthermore, allocation of such a high power level to the S-CCPCH increases the likelihood that the S-CCPCH will unacceptably interfere with communication channels allocated to other UEs engaged in active communications in neighboring cells. In addition, once power is allocated to the S-CCPCH, the allocated power remains static throughout the provision of the MBMS service regardless of any change in a location of one or more subscribing UEs and/or change in channel conditions. As a result, an allocation of a fixed amount of power to the S-CCPCH that is based on providing service to UEs located at an edge of a cell may be wasteful of a limited resource and may create undesirable levels of interference.

Therefore, a need exists for a method and apparatus that provides for an allocation to the S-CCPCH of a power level that is appropriate for the requirements of the UEs subscribing to an MBMS service and that further provides for a dynamic setting and adjustment of the allocated power.

DETAILED DESCRIPTION OF THE INVENTION

Figure 1:
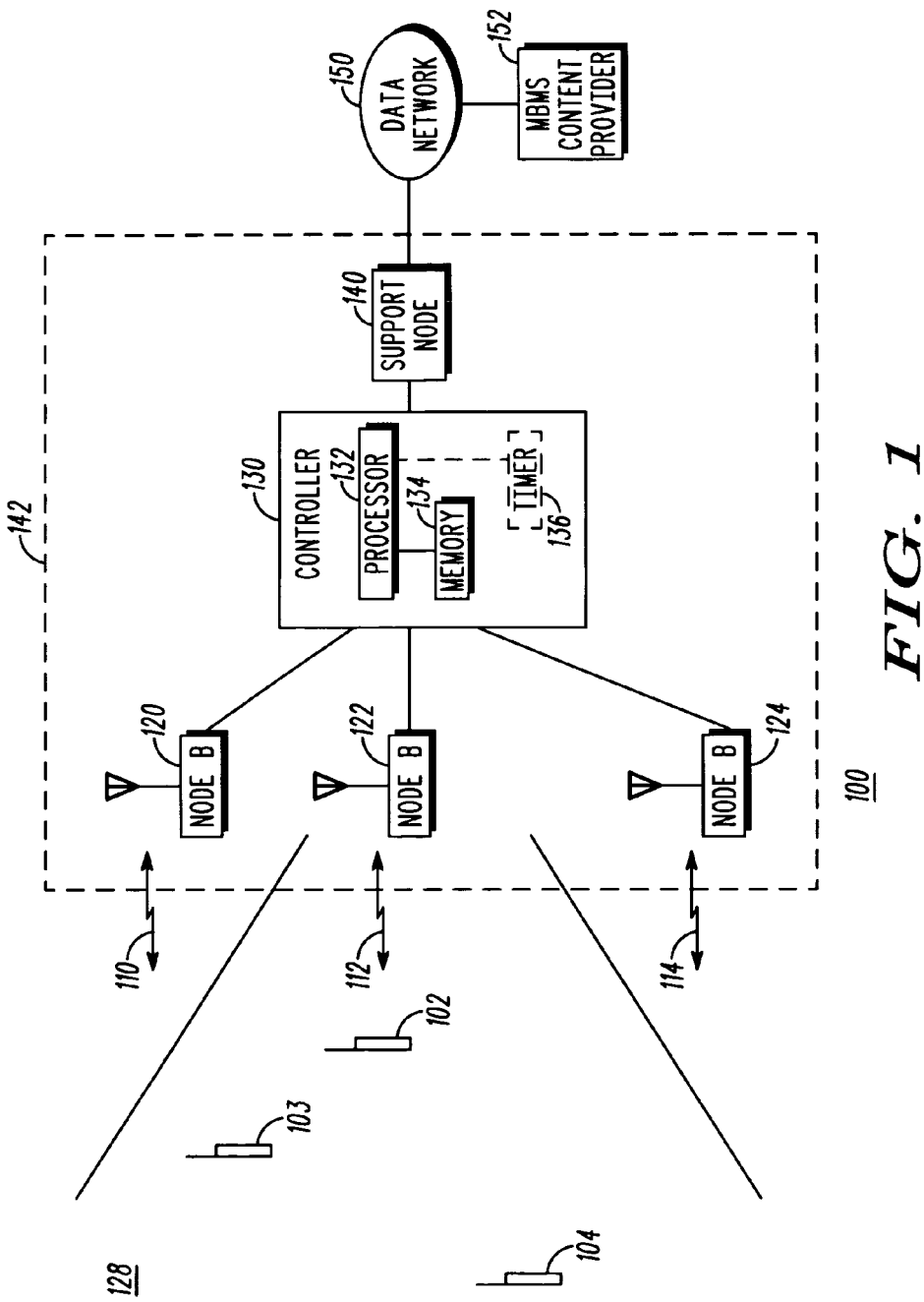
FIG. 1 is a block diagram of a wireless communication system in accordance with an embodiment of the present invention.

To address the need for a method and an apparatus that provides for an allocation to the S-CCPCH of a power level that is appropriate for the requirements of multiple user equipment (UEs) subscribing to a Multimedia Broadcast/Multicast Service (an MBMS service) and that further provides for a dynamic setting and adjustment of the allocated power, a communication system is provided that dynamically allocates power to the MBMS service. In response to determining to establish a Point-to-Multipoint (PTM) communication channel to multiple UEs, the communication service assigns the PTM communication channel to the MBMS service, determines a power requirement associated with each user equipment (UE) of the multiple UEs based on a handover quality measurement associated with the UE to produce multiple power requirements, and allocates a power level to the PTM communication channel based on the multiple power requirements. The communication system further dynamically adjusts the allocated power based on a handover quality measurement associated with a UE of the multiple UEs that is received during provision of the MBMS service.

Generally, an embodiment of the present invention encompasses a method for allocating power to an MBMS service. The method includes determining to establish a PTM communication channel to multiple UEs, assigning the PTM communication channel to the MBMS service, determining a power requirement associated with each UE of the multiple UEs based on a handover quality measurement associated with the UE to produce multiple power requirements, and allocating a power level to the PTM communication channel based on the multiple power requirements.

Another embodiment of the present invention encompasses a method for adjusting a power of an MBMS service. The method includes receiving, during a provision of the MBMS service, a handover quality measurement associated with a UE, determining a power requirement associated with the UE based on the received handover quality measurement report, and adjusting a power level of a Point-to-Multipoint (PTM) communication channel based on the determined power requirement.

Yet another embodiment of the present invention encompasses a network controller that determines to establish a PTM communication channel to multiple UEs in order to provide an MBMS service, assigns the PTM communication channel to the MBMS service, determines a power requirement associated with each UE of the multiple UEs based on a handover quality measurement associated with the UE to produce multiple power requirements, and allocates a power level to the PTM communication channel based on the multiple power requirements.

Still another embodiment of the present invention encompasses a network controller that receives, during a provision of an MBMS service, a handover quality measurement associated with a UE, determines a power requirement associated with the UE based on the received handover quality measurement report, and adjusts a power level of a PTM communication channel based on the determined power requirement.

The present invention may be more fully described with reference to FIGS. 1-5. FIG. 1 is a block diagram of a wireless communication system 100 in accordance with an embodiment of the present invention. Communication system 100 includes multiple Node Bs 120, 122, and 124 (three shown). Each Node B 120, 122, 124 is operably coupled to a network controller 130, preferably a Radio Network Controller (RNC); however, in another embodiment of the present invention, one or more of Node Bs 120, 122, 124 may be coupled to a different network controller. Each Node B 120, 122, 124 provides wireless communication services to user equipment (UEs) located in a respective coverage area, such as cell or a sector of a cell, associated with the Node B via a respective air interface 110, 112, and 114. Each air interface 110, 112, and 114 comprises a downlink having multiple downlink logical and transport channels, including at least one broadcast channel, at least one traffic channel, and at least one control channel, that may be mapped to one or more of multiple downlink physical channels, including at least one common control channel, at least one dedicated channel, and at least one pilot channel. Each air interface 110, 112, and 114 further comprises an uplink having multiple uplink logical and transport channels, including an access channel, at least one traffic channel, and at least one control channel, that may be mapped to one or more of multiple uplink physical channels.

Communication system 100 further includes multiple user equipment (UEs) 102-104, such as but not limited to a cellular telephone, a radio telephone, a personal digital assistant (PDA) with radio frequency (RF) capabilities, or a wireless modem that provides RF access to digital terminal equipment (DTE) such as a laptop computer. Each UE of the multiple UEs 102-104 resides in a coverage area 128 serviced by a serving Node B, that is, Node B 122, of the multiple Node Bs. Each UE 102-104 is further in soft handoff with one or more Node Bs other than serving Node B 122, such as one or more of Node Bs 120 and 124.

Each UE 102-104 subscribes to, and is capable of receiving and displaying audio, video, and/or data associated with, a Multimedia Broadcast/Multicast Service (an MBMS service) provided by communication system 100, which service provides for a distribution of MBMS data to the UE. MBMS services are described in detail in the 3GPP TS 25.344 (Third Generation Partnership Project Technical Specification 25.344) v0.5.0, 3GPP TS 23.246 v1.1.0, 3GPP TS 23.846 v6.1.0, 3GPP TS 25.331 v5.6.0, and 3GPP TS 25.346 v0.5.0, which specifications and reports are hereby incorporated by reference herein and copies of which may be obtained from the 3GPP via the Internet or from the 3GPP Organization Partners' Publications Offices at Mobile Competence Centre 650, route des Lucioles, 06921 Sophia-Antipolis Cedex, France.

Communication system 100 further includes a Support Node 140 coupled to network controller 130. Support Node 140 typically includes one or more Serving GPRS Support Nodes (SGSNs) that are each coupled to one or more Gateway GPRS Support Nodes (GGSNs). However, the precise architecture of Support Node 140 is up to an operator of communication system 100 and is not critical to the present invention. Although not shown, communication system 100 may further include other well-known network elements, such as a Broadcast Multicast Service Center (BM-SC) or a Gateway. Together, the multiple Node Bs 120, 122, 124, network controller 130, and Support Node 140 are collectively referred to herein as a communication system infrastructure 142.

Communication system 100 further includes an MBMS content provider 152, such as an IP multicast server, that is coupled to infrastructure 142 via a data network 150, such as an IP network. As part of an MBMS service provided by communication system 100 and subscribed to by each UE 102-104, MBMS content provider 152 sources MBMS data, typically in the form of IP data packets, to each subscribed UE via support node 140 and serving controller 130 and Node B 122.

Figure 2:
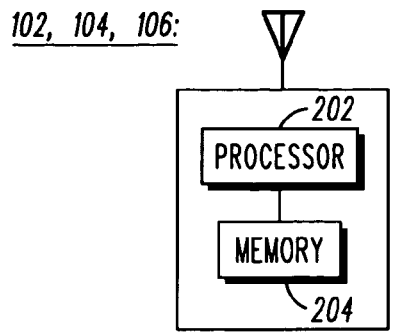
FIG. 2 is a block diagram of a mobile station of FIG. 1 in accordance with an embodiment of the present invention.

Referring now to FIGS. 1 and 2, each of UEs 102-104 and controller 130 includes a respective processor 202, 132 such as one or more microprocessors, microcontrollers, digital signal processors (DSPs), combinations thereof or such other devices known to those having ordinary skill in the art. Each of UEs 102-104 and controller 130 further includes a respective one or more memory devices 204, 134 associated with the corresponding processor, such as random access memory (RAM), dynamic random access memory (DRAM), and/or read only memory (ROM) or equivalents thereof, that store data and programs that may be executed by the processor and allow the processor to operate in communication system 100.

Preferably, communication system 100 is a Universal Mobile Telecommunication Service (UMTS) communication system that operates in accordance with the 3GPP (Third Generation Partnership Project) standards, which provide a compatibility standard for UMTS air interfaces and which standards are hereby incorporated herein in their entirety. The standards specify wireless telecommunications system operating protocols, including radio system parameters and call processing procedures. In a UMTS communication system such as communication system 100, a communication channel comprises a logical and/or a transport channel, typically an orthogonal code, that is mapped to a physical channel, typically a frequency bandwidth. However, those who are of ordinary skill in the art realize that communication system 100 may operate in accordance with any wireless telecommunication system, such as but not limited to a General Packet Radio Service (GPRS) communication system, a Code Division Multiple Access (CDMA) 2000 communication system, a Time Division Multiple Access (TDMA) communication system, or an Orthogonal Frequency Division Multiple Access (OFDM) communication system.

As noted above, each UE of the multiple UEs 102-104 subscribes to an MBMS service provided by communication system 100. The MBMS service provides for a conveyance of MBMS data, via a multicast or a unicast communication session and typically in a format of Internet Protocol (IP) data packets, to each subscribed UE. As is known in the art, when communication system 100 has MBMS data to provide to subscribers to the MBMS service, the communication system first estimates the number of recipients, that is, subscribed UEs, such UEs 102-104, residing in coverage area 128. Based on the estimated number of recipients, network controller 130 determines whether to establish a Point-To-Multipoint (PTM) communication channel in the coverage area or a Point-To-Point (PTP) channel to each recipient.

When network controller 130 determines to establish a PTM communication channel, the network controller assigns a PTM communication channel at serving Node B 122 for a multicast of the data, which communication channel typically comprises a common physical channel such as a Secondary Common Control Physical Channel (S-CCPCH). Network controller further allocates a power level to the assigned communication channel. Network controller 130 informs each subscribed UE 102-104 of the assigned PTM communication channel and then multicasts the MBMS data to the subscribed UEs via serving Node B 122 and the assigned channel.

In the prior art, in order to multicast MBMS data to subscribed UEs residing in a cell, an RNC would allocate a power level to the PTM communication channel that is sufficient to achieve a target error rate, such as a one percent (1%) Block Error Rate (BLER), at the edges of the cell. This power level is set regardless of the actual power level requirements of the subscribed UEs residing in the cell. The allocated power level then remains fixed, that is, is static, for the duration of the MBMS service. In order to avoid the resource waste and potential interference associated with the power allocation scheme of the prior art, instead communication system 100 dynamically sets and adjusts the power level allocated to an MBMS service based on the individual power requirements of subscribed UEs serviced by a Node B.

Figure 3:
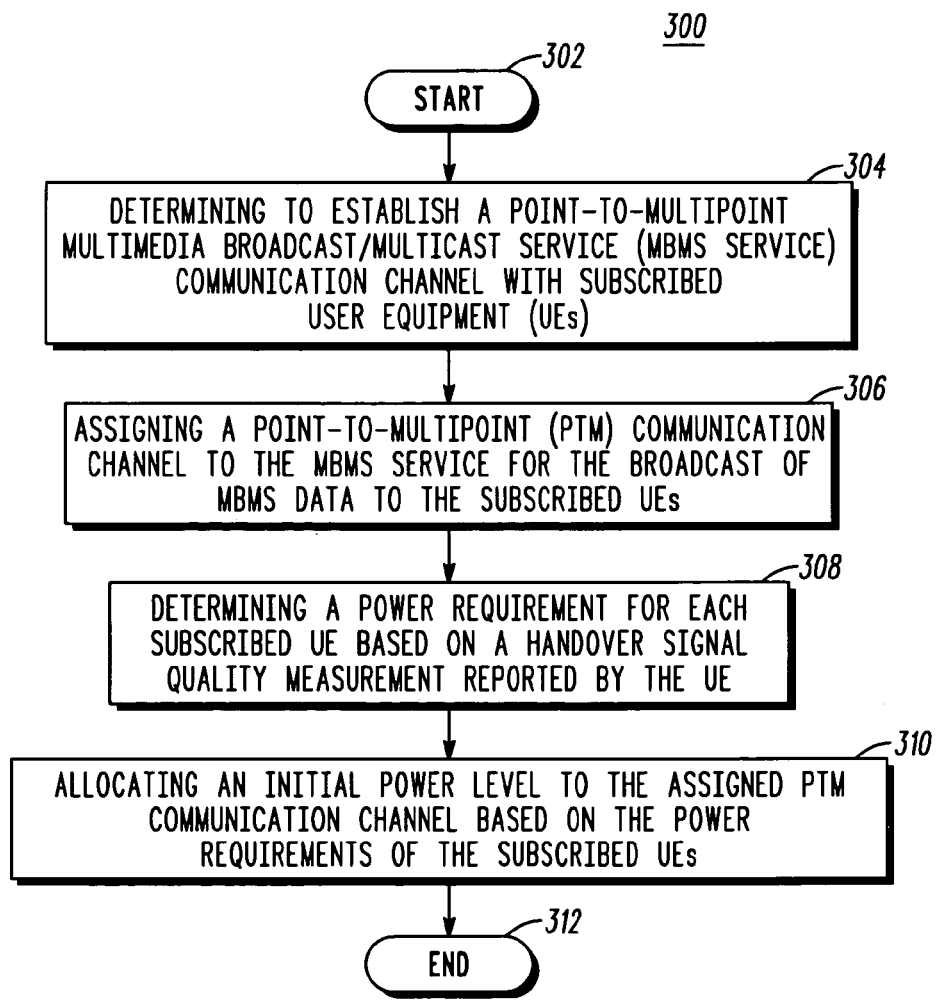
FIG. 3 is a logic flow diagram of a method by which the communication system of FIG. 1 dynamically allocates power to a Multimedia Broadcast/Multicast Service in accordance with an embodiment of the present invention.

Referring now to FIG. 3, a logic flow diagram 300 is provided that illustrates a method by which communication system 100 dynamically allocates power to an MBMS service in accordance with an embodiment of the present invention. Logic flow diagram 300 begins (302) when network controller 130 determines (304), in order to transmit MBMS data associated with the MBMS service, to establish a Point-To-Multipoint (PTM) communication channel to subscribed UEs 102-104 residing in coverage area 128. In response to determining to establish a Point-To-Multipoint (PTM) communication channel, network controller 130 assigns (306) a PTM communication channel in the forward link of air interface 112 to the MBMS service for a multicast of the MBMS data to subscribed UEs 102-104.

In order to allocate an initial power level for the assigned PTM communication channel, network controller 130 determines (308) a power requirement for each subscribed UE 102-104 serviced by Node B 122. Each UE's power requirement is determined based on one or more handover signal quality measurements reported by the UE. By determining the UE's power requirement based on handover signal quality measurements, communication system 100 does not have to assign or establish any additional uplink communication channels to each of the subscribed UEs so that the UE may report back signal quality measurements related to the assigned PTM communication channel. Since the number of UEs subscribing to an MBMS service and serviced by a Node B may be significant, a capacity savings from utilizing already reported signal quality measurements and not having to assign additional communication channels may be substantial.

In particular, when each UE 102-104 is operating in a soft handoff mode, the UE maintains, in the at least one memory device 204 of the UE, an 'Active Set.' The Active Set comprises a cell identifier and/or one or more of a logical, transport, and/or physical channel, typically comprising a pilot channel such as a Common Pilot Channel (CPICH), associated with each of one or more neighboring Node Bs, such as Node Bs 120 and 124, that are engaged in soft handoff with the UE, that is, that are simultaneously involved in a communication service with the UE and that are potential candidates for handoff or cell reselection by the UE. As part of soft handoff, each UE 102-104 monitors the logical, transport, and/or physical channel associated with each Active Set Node B and measures a signal quality, such as a received signal code power to interference plus noise ratio (Ec/Io) or a Channel Quality Indicator (CQI), in association with each monitored channel. The UE then reports the signal quality measurements to network controller 130, typically in a Measurement Report that is conveyed to the controller via serving Node B 122 and an uplink control channel of associated air interface 112. In response to receiving the signal quality measurements from a UE 102-104, network controller 130 stores the received signal quality measurements in association with the UE in the one or more memory devices 134 of the controller.

Network Controller 130 sets the criterion for the reporting of the signal quality measurements by each UE 102-104. For example, controller 130 may instruct each UE 102-104 to report the UE's signal quality measurements periodically. By way of another example, controller 130 may instruct each UE 102-104 to periodically report a signal quality measurement for so long as the signal quality measurement is less than a signal quality threshold. The signal quality threshold may be programmed into the one or more memory devices 204 of the UE or may be conveyed to the UE by the controller and then stored in the one or more memory devices 204 of the UE. Unless otherwise specified herein, each function performed by a UE 102-104 is performed by processor 202 of the UE, and each function performed by network controller 130 is performed by processor 132 of the controller.

Based on the received signal quality measurements, network controller 130 then determines a power requirement associated with each UE 102-104 subscribed to the MBMS service. For example, the power requirement (P) associated with each UE (that is, $P_i$ for the $i^{th}$ UE) may be determined based on multiple signal quality measurements reported by each UE 102-104 in accordance with equation (1), $$P_i = \begin{cases} 1/B\,(\log(\text{target error rate}) + C) * f(\lambda_i(k), \lambda_i(k-1), \ldots, \lambda_i(k-K)) \\ P_{min}, \text{ when no measurement reports are stored for this } UE, \end{cases} \quad (1)$$

where $\lambda_i(k)$ is the $k^{th}$ signal quality measurement for the $i^{th}$ UE and $P_{min}$ is a minimum power level that may be allocated to the MBMS service, which value may be set by an operator of communication system 100 and maintained in the one or more memory devices 134 of controller 130. Those who are of ordinary skill in the art realize that the function ($f$) used to evaluate the multiple signal quality measurements associated with each UE 102-104 is up to the operator of communication system 100 and that any one of many functions may be used herein without departing from the spirit and scope of the present invention. For example, the function may involve combining the multiple signal quality measurements, combining and averaging the multiple signal quality measurements, or weighting and combining the multiple signal quality measurements. The target error rate is the target error rate for the MBMS service that is also set by the operator of communication system 100 and corresponds to a predetermined error rate that the operator believes is acceptable for the MBMS service. Those who are of ordinary skill in the art realize that any one of many error rates may be used herein, for example, a Block Error Rate (BLER), a Frame Error Rate (FER), or a Bit Error Rate (BER).

B and C are constants that may be determined by curve-fitting an equation to a curve graphing a power level for a multicast of MBMS data, on a horizontal (X) axis, against a corresponding error rate, such as BLER, on the vertical (Y) axis. The curve may be empirically determined or may be based on system simulations. Since communication system 100 is likely to operate only within a restricted range of MBMS power levels (that is, between a maximum MBMS power level $P_{max}$ and a minimum MBMS power level $P_{min}$), the curve may be approximated as a linear curve in that power level region and, as a result, the curve fit may produce a linear equation wherein B corresponds to a slope of the equation and C corresponds to a vertical (Y) axis intercept. Equation 1 is provided as an example of a power requirement determination based on one or more handover signal quality measurements reported by a UE and those who are of ordinary skill in the art realize that other equations may be used herein for determining a power requirement of a UE based on one or more handover signal quality measurements without departing from the spirit and scope of the present invention.

Based on the power requirements associated with subscribed UEs 102-104, network controller 130 allocates (310) an initial power level to the PTM communication channel assigned for multicast of the MBMS data. Logic flow 300 then ends (312). Preferably, controller 130 allocates the power level by first ranking the power requirements of each of the subscribed UEs 102-104 serviced by Node B 122. For example, controller 130 may rank the power requirements of each subscribed UE in descending order, starting with the UE with the highest power requirement (that is, $P_1 \geq P_2 \geq \ldots \geq P_N$ for 'N' UEs serviced by Node B 122). For example, with respect to FIG. 1, if UE 102 is closest to Node B 122, UE 104 is farthest from the Node B, and the downlink power requirement for each UE 102-104 is directly correlated to the distance of the UE from the Node B, then a determination of the power requirements associated with each UE may result in controller 130 ranking the UE power requirements, from highest to lowest, as follows: $P_{UE\ 104}$, $P_{UE\ 103}$, $P_{UE\ 102}$. However, one of ordinary skill in the art realizes that various formats may be used herein for a ranking of the power requirements associated with each UE and that the format used is up to a designer of system 100.

Controller 130 may then allocate a power level, $P_{MBMS}$, to the MBMS service, that is, to the PTM communication channel used to multicast MBMS data by Node B 122, based on the power requirements rankings. For example, $P_{MBMS}$ may be determined in accordance with equation (2), $$P_{MBMS} = \min(P_{max}, P_{highest}) \quad (2)$$

$P_{max}$ is a maximum power level that may be allocated to the MBMS service, which value may set by an operator of communication system 100 and maintained in the one or more memory devices 134 of controller 130. $P_{highest}$ is the power requirement of the subscribed UE with the highest power requirement per the ranking. For example, when the UE power requirements for UEs 102-104 are, from highest to lowest, $P_{UE\ 104}$, $P_{UE\ 103}$, $P_{UE\ 102}$, then $P_{highest} = P_{UE\ 104}$. The power initially allocated to the MBMS service is then the lesser of the maximum power level that may be allocated to the MBMS service and the power requirement of the subscribed UE with the highest power requirement per the ranking (that is, the power requirement of UE 104). One may further note that $P_{max} \geq P_{MBMS} \geq P_{min}$.

By allocating a power level to the PTM communication channel based on a highest power level requirement of the subscribed UEs, communication system 100 is able to minimize the power allocated to the PTM communication channel while providing universal coverage to the subscribed UEs. Furthermore, by determining the power level requirement of each subscribed UE based on handover signal quality measurements, communication system 100 does not have to assign or establish any additional uplink communication channels to each of the subscribed UEs in order that the UE may report back signal quality measurements related to the assigned PTM communication channel. Since the number of UEs subscribing to an MBMS service and serviced by a Node B may be significant, a capacity savings from utilizing already reported signal quality measurements and not having to assign additional communication channels may be substantial.

After the MBMS service is initiated, communication system 100, and in particular network controller 130, may dynamically adjust the power level allocated to the MBMS service, that is, the power level of the PTM communication channel, during provision of the MBMS service. In one embodiment of the present invention, network controller 130 may adjust the power level of the PTM communication channel based on a handover signal quality measurement report received by the controller subsequent to the allocation of an initial power level to the PTM communication channel. For example, the handover signal measurement report may be conveyed to infrastructure 142, and in particular network controller 130, by a UE required to convey handover measurement reports periodically. By way of another example, the handover signal measurement report may be conveyed to infrastructure 142, and in particular network controller 130, by a UE whose signal quality measurement has fallen below or above a corresponding signal quality threshold.

Figure 4:
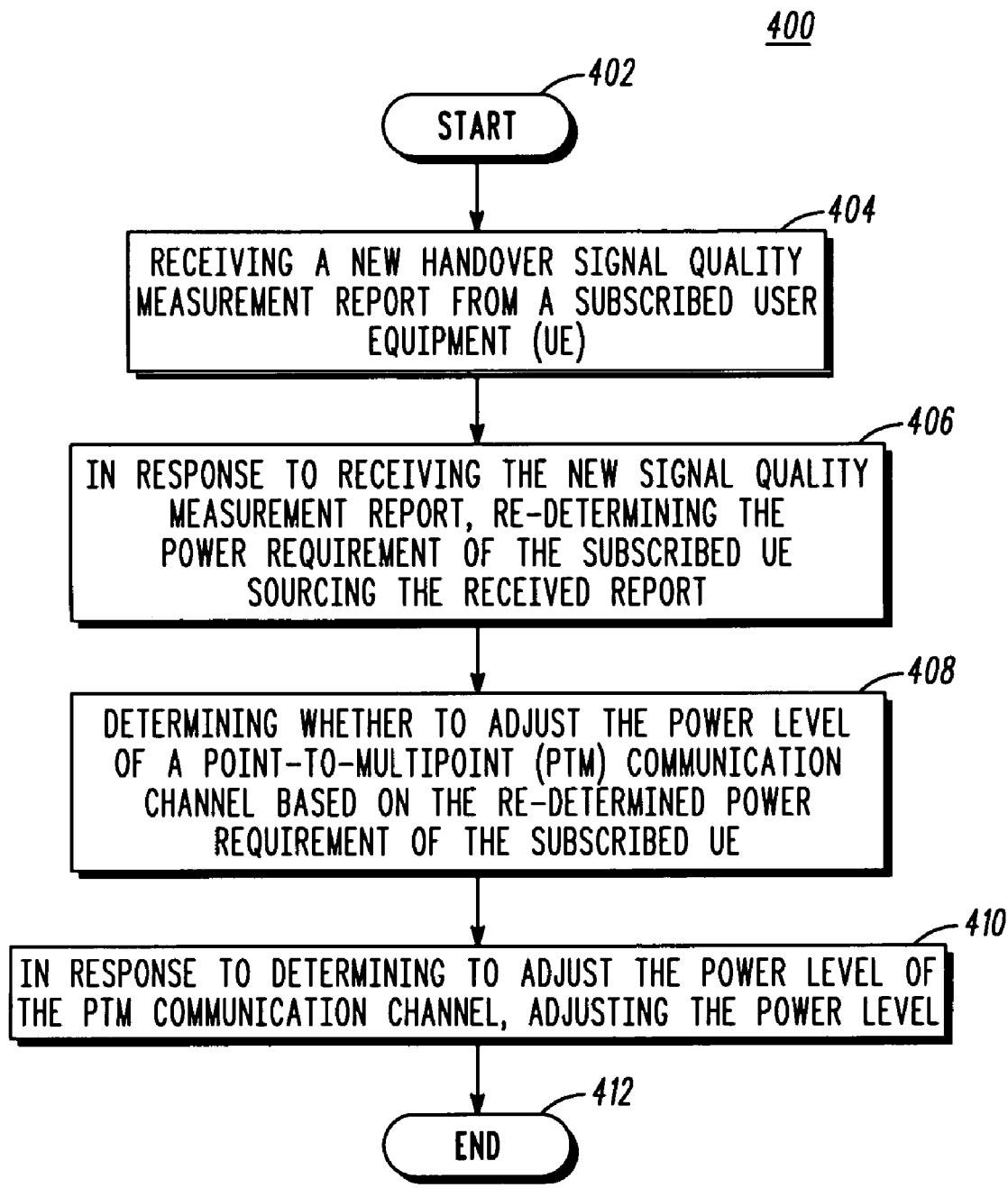
FIG. 4 is a logic flow diagram of a method by which the communication system of FIG. 1 adjusts a power level of an MBMS service in accordance with an embodiment of the present invention.

FIG. 4 is a logic flow diagram 400 of a method executed by communication system 100 in adjusting a power level of the MBMS service, that is, of the PTM communication channel, based on a handover signal quality measurement report received by infrastructure 142 subsequent to the allocation of an initial power level to the PTM communication channel. Logic flow 400 begins (402) when infrastructure 142, and in particular network controller 130, receives (404) a new handover signal quality measurement report from a subscribed UE. Again, by adjusting a power level of the MBMS service based on a UE's handover signal quality measurements, communication system 100 does not have to assign or establish any additional uplink communication channels to each of the subscribed UEs so that the UE may report back signal quality measurements related to the assigned PTM communication channel.

In response to receiving the measurement report, controller 103 re-determines (406) the power requirement for the UE and re-ranks the power requirements of the subscribed UEs serviced by Node B 122 based on the re-determined power requirement for this UE. Again, the power requirement for this UE may be re-determined based on equation (1), which is repeated in relevant part below, $$P_i=1/B(\log(\text{target error rate})+C) \times f(\lambda_i(k), \lambda_i(k-1), \ldots, \lambda_i(k-K)).$$

Based on the re-ranking of the power requirements of the subscribed UEs, network controller 130 determines (408) whether to adjust the power level of the PTM communication channel. For example, controller 130 may determine whether to adjust the power level of the PTM communication channel by determining, by reference to equation (1) (that is, $P_{MBMS}=\min(P_{max}, P_{highest})$, where $P_{highest}$ now corresponds to the power requirement of the subscribed UE 102-104 with the highest power requirement after the re-ranking), whether $P_{MBMS}$ has changed. When controller 130 determines that $P_{MBMS}$ has changed, then controller 130 may adjust (410) the power level of the PTM communication channel in accordance with the change in $P_{MBMS}$ and logic flow 400 then ends (412).

For example, when controller 130 determines, in response to re-ranking the power requirements of subscribed UEs 102-104 serviced by Node B 122, that the power requirement associated with the UE with the highest power requirement ($P_{highest}$) remains the same as before the re-ranking that is, that $P_{highest}$ has not changed, then controller 130 may determine not to adjust the power level of the PTM communication channel used to multicast the MBMS data. By way of another example, when controller 130 determines, in response to re-ranking the power requirements, that the power requirement associated with the UE with the highest power requirement has changed, then controller 130 may further determine whether an adjustment is indicated. For example, if $\min(P_{max}, P_{highest})=P_{max}$ prior to the re-ranking and $\min(P_{max}, P_{highest})=P_{max}$ after the re-ranking, then controller 130 may determine not to adjust the power level of the PTM communication channel even though $P_{highest}$ has changed. However, if $P_{highest}$ has changed and $\min(P_{max}, P_{highest})=P_{highest}$ after the re-ranking, then controller 130 may determine to adjust the power level of the PTM communication channel.

Figure 5:
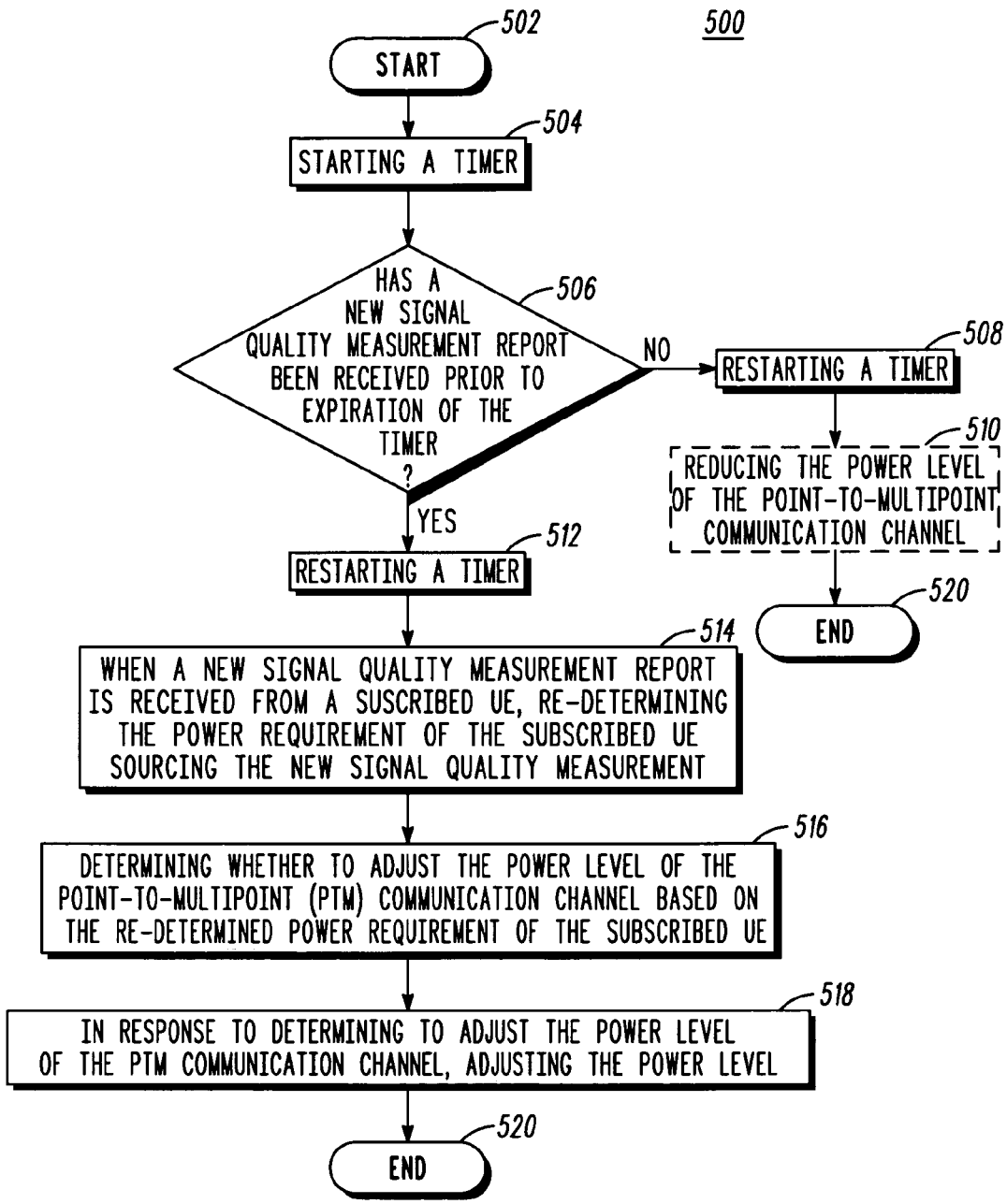
FIG. 5 is a logic flow diagram of a method by which the communication system of FIG. 1 adjusts a power level of an MBMS service in accordance with another embodiment of the present invention.

In another embodiment of the present invention, wherein a UE 102-104 may report a handover signal quality measurement only when the signal quality measurement is less than a threshold, network controller 130 may adjust the power level allocated to the MBMS service, and in particular the power level of the PTM communication channel, even in the absence of a subsequently received handover signal quality measurement report. FIG. 5 is a logic flow diagram of a method executed by communication system 100 in adjusting the power level of the PTM communication channel in accordance with another embodiment of the present invention. Logic flow diagram 500 begins (502) when network controller 130 starts (504) a timer 136 included in the network controller. For example, controller 130 may start timer 136 in response to transmitting MBMS data on the PTM communication channel or in response to receiving a handover signal quality measurement report from any one or more of subscribed UEs 102-104. Timer 136 is coupled to processor 132 and counts down a reporting time period T. T corresponds to a time period between handover measurement reports when a UE 102-104 is required to periodically report a signal quality measurement for so long as the signal quality measurement is less than a signal quality threshold.

When timer 136 expires (506) prior to controller 130 receiving a new handover signal quality measurement report from a subscribed UE 102-104, then the controller may infer that the power level allocated to the PTM communication channel is high enough to provide acceptable service to all subscribed UEs 102-104. In one such embodiment of the present invention, controller 130 may then-restart (508) timer 136 and logic flow 500 the ends (520). In another such embodiment of the present invention, when timer 136 expires (506) prior to controller 130 receiving a new handover signal quality measurement report from a subscribed UE 102-104, controller 130 may, in addition to restarting (508) timer 136, reduce (510) the power level of the PTM communication channel. For example, when the power allocated to the PTM communication channel, that is, $P_{MBMS}$, is greater than $P_{min}$ at the time that timer 136 expires, controller 130 may reduce the power allocated to the PTM communication channel to $P_{min}$, that is, set $P_{MBMS}=P_{min}$. By reducing the power level of the PTM communication channel, controller 130 endeavors to allocate a power level to the PTM communication channel that is the minimum acceptable power level that will provide universal coverage to all subscribed UEs.

When network controller 130 receives (506) a new handover signal quality measurement report from a subscribed UE 102-104 prior to expiration of timer 136, then the controller restarts (512) timer 136 and determines whether to adjust the power level of the PTM communication channel based on the received measurement report, which determination is described in detail above with respect to logic flow diagram 400. That is, similar to step 406, in response to receiving the measurement report, controller 103 re-determines (514) the power requirement for the UE and re-ranks the power requirements of the subscribed UEs 102-104 serviced by Node B 122 based on the re-determined power requirement for this UE. Based on the re-ranking of the power requirements of the subscribed UEs and similar to step 408, controller 130 then determines (516) whether to adjust the power level of the PTM communication channel. For example, controller 130 may determine whether to adjust the power level of the PTM communication channel by determining, by reference to equation (1) (that is, $P_{MBMS}=\min(P_{max}, P_{highest})$), whether $P_{MBMS}$ has changed, where $P_{highest}$ corresponds to the power requirement of the subscribed UE of the multiple UEs 102-104 with the highest power requirement after the re-ranking. When controller 130 determines that $P_{MBMS}$ has changed, then, similar to step 410, controller 130 may adjust (518) the power level of the PTM communication channel in accordance with the change in $P_{MBMS}$. Logic flow 500 then ends (520).

By allocating a power to a PTM communication channel assigned to an MBMS service, and further adjusting the power of the PTM communication channel, based on handover quality measurements, communication system 100 is able to dynamically set and adjust the power of the MBMS service. By using handover quality measurements, communication system 100 is able to consider the power requirements of each subscribed UE and minimize the power allocated to the PTM communication channel while providing universal coverage to the subscribed UEs. Furthermore, by determining the power level requirement of subscribed UEs based on handover signal quality measurements, communication system 100 does not have to assign or establish any additional uplink communication channels to each of the subscribed UEs in order that the UE may report back signal quality measurements related to the assigned PTM communication channel.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for adjusting a power of a Multimedia Broadcast/Multicast Service (an MBMS service) comprising:
   starting a timer;
   when a handover measurement report associated with a user equipment (UE) is received, during a provision of the MBMS service and prior to an expiration of the timer:
      determining a power requirement associated with the UE based on the received handover measurement report;
      adjusting a power level of a Point-to-Multipoint (PTM) communication channel based on the determined power requirement; and
   when a handover measurement report associated with the UE is not received during a provision of the MBMS service and prior to the expiration of the timer:
      determining to not adjust a power level of the PTM communication channel; and
      restarting the timer.

2. The method of claim 1, wherein the user equipment (UE) is one of a plurality of user equipment (UEs) and wherein adjusting comprises:
   determining a power requirement associated with each of the other UEs of the plurality of UEs;
   ranking the power requirements associated with each UE of the plurality of UEs; and
   adjusting a power level of a Point-to-Multipoint communication channel based on the ranking.

3. The method of claim 2, wherein adjusting comprises adjusting a power level of a Point-to-Multipoint communication channel based on the ranking and a maximum power level for the Multimedia Broadcast/Multicast Service.

4. A method for adjusting a power of a Multimedia Broadcast/Multicast Service (an MBMS service) comprising:
   starting a timer;
   when a handover measurement report associated with a user equipment (UE) is received during a provision of the MBMS service and prior to an expiration of the timer
      determining a power requirement associated with the UE based on the received handover measurement repot;
      adjusting a power level of a Point-to-Multipoint communication channel based on the determined power requirement; and
   when a handover measurement report associated with the UE is not received during a provision of the MBMS service prior to the expiration of the timer, reducing a power level of the Point-to-Multipoint communication channel.

5. A network controller that is configured to:
   start a timer;
   when a handover measurement report associated with a user equipment (UE) is received, during a provision of a Multimedia Broadcast/Multicast Service (an MBMS service) and prior to an expiration of the timer:
      determine a power requirement associated with the UE based on the received handover measurement report;
      adjust a power level of a Point-to-Multipoint (PTM) communication channel based on the determined power requirement; and
   when a handover measurement report associated with the UE is not received during a provision of the MBMS service and prior to the expiration of the timer:
      determine to not adjust a power level of the Point-to-Multipoint communication channel; and
      restart the timer.

6. The controller of claim 5, wherein the user equipment (UE) is one of a plurality of user equipment (UEs) and wherein the controller adjusts a power level of a Point-to-Multipoint (PTM) communication channel by determining a power requirement associated with each of the other UEs of the plurality of UEs, ranking the power requirements associated with each UE of the plurality of UEs, and adjusting a power level of the PTM communication channel based on the ranking.

7. The controller of claim 6, wherein the controller adjusts a power level of a Point-to-Multipoint (PTM) communication channel by adjusting a power level of a PTM communication channel based on the ranking and a maximum power level for the Multimedia Broadcast/Multicast Service.

8. A network controller that is configured to:
   start a timer;
   when a handover measurement report associated with a user equipment (UE) is received during a provision of a Multimedia Broadcast/Multicast Service (an MBMS service) and prior to an expiration of the timer:

determine a power requirement associated with the UE based on the received handover measurement report;

adjust a power level of a Point-to-Multipoint (PTM) communication channel based on the determined power requirement; and when a handover measurement report associated with the UE is not received during a provision of the MBMS service prior to the expiration of the timer, reduce a power level of the Point-to-Multipoint communication channel.

9. The method of claim 4, wherein the user equipment (UE) is one of a plurality of user equipment (UEs) and wherein adjusting comprises:

determining a power requirement associated with each of the other UEs of the plurality of UEs;

ranking the power requirements associated with each UE of the plurality of UEs; and adjusting a power level of a Point-to-Multipoint communication channel based on the ranking.

10. The method of claim 4, wherein adjusting comprises adjusting a power level of a Point-to-Multipoint communication channel based on the ranking and a maximum power level for the Multimedia Broadcast/Multicast Service.

11. The controller of claim 8, wherein the user equipment (UE) is one of a plurality of user equipment (UEs) and wherein the controller adjusts a power level of a Point-to-Multipoint (PTM) communication channel by determining a power requirement associated with each of the other UEs of the plurality of UEs, ranking the power requirements associated with each UE of the plurality of UEs, and adjusting a power level of the PTM communication channel based on the ranking.

12. The controller of claim 8, wherein the controller adjusts a power level of a Point-to-Multipoint (PTM) communication channel by adjusting a power level of a PTM communication channel based on the ranking and a maximum power level for the Multimedia Broadcast/Multicast Service.

* * * * *